United States Patent
Theodosis (10) Patent No.: US 10,066,947 B2
(45) Date of Patent: Sep. 4, 2018

(54) METHODS AND APPARATUS FOR IMPROVED PRECISION STREET MAPS USING LOW COST SENSORS

(71) Applicant: Faraday&Future Inc., Gardena, CA (US)

(72) Inventor: Paul Alan Theodosis, Rancho Palos Verdes, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/334,914

(22) Filed: Oct. 26, 2016

(65) Prior Publication Data

US 2017/0122748 A1 May 4, 2017

Related U.S. Application Data

(60) Provisional application No. 62/249,099, filed on Oct. 30, 2015.

(51) Int. Cl.
*G01C 21/32* (2006.01)
*H04B 1/3822* (2015.01)
*H04W 4/04* (2009.01)

(52) U.S. Cl.
CPC ........... *G01C 21/32* (2013.01); *H04B 1/3822* (2013.01); *H04W 4/046* (2013.01)

(58) Field of Classification Search
CPC ...... G01C 21/32; H04B 1/3822; H04W 4/046
See application file for complete search history.

(56) References Cited

U.S. PATENT DOCUMENTS

| | | | | |
|---|---|---|---|---|
| 6,615,130 B2 * | 9/2003 | Myr | .................. | G01C 21/3492 340/988 |
| 2007/0185649 A1 * | 8/2007 | Geilich | .................. | G01C 21/32 701/532 |
| 2011/0160995 A1 * | 6/2011 | Geilich | .................. | G01C 21/32 701/532 |
| 2013/0018575 A1 * | 1/2013 | Birken | ............... | G01B 11/2513 701/409 |

OTHER PUBLICATIONS

Chazal et al, Data-Driven Trajectory Smoothing., ACM SIGSPATIAL GIS '11, Nov. 1-4, 2011. Chicago, IL, USA, Copyright 2011, ACM 978-1-4503-1031-4/11/11, 14 pages.

* cited by examiner

*Primary Examiner* — Russell Warren Frejd
(74) *Attorney, Agent, or Firm* — Knobbe Martens Olson & Bear LLP (57) ABSTRACT

Methods and systems for increasing the precision of a map include receiving a plurality of messages over a network from a corresponding plurality of vehicles. The vehicles may be equipped with positioning devices such as a global positioning receiver. The positioning devices in the vehicles may be of a lower cost and therefore provide location precisions within approximately ten (10) meters. The locations of the plurality of vehicles may be used as control points in one or more interpolation algorithms to adjust the position of road information included in a map. Thus, higher precision maps may be generated through the use of relatively lower cost positioning devices in the vehicles.

22 Claims, 5 Drawing Sheets

METHODS AND APPARATUS FOR IMPROVED PRECISION STREET MAPS USING LOW COST SENSORS

CROSS REFERENCE TO RELATED APPLICATIONS

This application claims priority to U.S. Provisional Application No. 62/249,099, filed Oct. 30, 2015, and entitled "METHODS AND APPARATUS FOR IMPROVED PRECISION STREET MAPS USING LOW COST SENSORS." The content of this prior application is considered part of this application, and is hereby incorporated by reference in its entirety.

BACKGROUND

Field of the Disclosure

This disclosure relates to methods, systems, and apparatus of improving the precision of existing street maps using low grade location sensors in vehicles.

Description of the Related Art

Existing street maps were developed to satisfy the needs of human drivers, and thus provide position information for roads, bridges, and other objects to a level of precision adequate for their intended use. Variations between the map and an objects actual position on the earth's surface is readily compensated by human drivers, as they are observing the road and making constant corrections based on their visual perception of objects within a close proximity to the vehicle.

Autonomous driving systems may benefit from maps having a higher precision than that of the existing street maps discussed above. For example, autonomous driving methods may benefit from a fusion of information provided not only by on board visual imaging system and radar based systems, but also from input from street maps, especially if those street maps provide a high level of accuracy. Thus, there is a need for higher precision street maps suitable for use by autonomous driving systems.

SUMMARY OF THE DISCLOSURE

The systems, methods, and apparatus of this disclosure each have several innovative aspects, no single one of which is solely responsible for the desirable attributes disclosed herein.

Many positioning devices (such as global positioning receivers) used in mass produced products (such as vehicles) are designed to utilize relatively inexpensive components such as processors and antennas in order to manage costs associated with the mass production. These components may provide a position uncertainty as large as 10 meters. Many autonomous driving features may benefit from high precision maps of roadways. One method used to create accurate maps of roadways is through the use of expensive and highly accurate sensors. This solution may be expensive and time intensive as there are relatively fewer cars built with positioning sensors having the accuracy necessary to individually provide a high precision location of a roadway.

An alternative approach leverages large amounts of relatively lower-quality data produced by production vehicles that travel on the roads every day. In the disclosed embodiments, large amounts of data produced by production vehicles may be aggregated to gain a more precise estimate of the true geometry of a given roadway. With a low grade GPS unit, the accuracy of the location increases with time if the unit is stationary. Given a large enough number of location data points, the average of the locations reported over time may average to the true location of the unit. For example, the distribution of location information may resemble a classic "bell" curve. As the number of location measurements increases, the accuracy of a median or mean of the bell curve increases as well. This may be applied to data received from multiple vehicles passing over a particular segment of road. As the number of vehicles that pass over the segment of road increases, the accuracy of the location of the road segment may be improved.

One aspect disclosed is a method of increasing the precision of an existing map. The method includes receiving, from a network, a first plurality of messages from a second plurality of vehicles, decoding each of the first plurality of messages to determine a third plurality of locations of the corresponding vehicles, and updating position information in a map based on the third plurality of locations. Some aspects of the method include setting control points in an interpolation algorithm based on the third plurality of locations; and updating position information in the map based on a result of the interpolation algorithm. In some of these aspects, the method includes updating position information in the map based on a result of a b-spline interpolation algorithm. In some of these aspects, the method includes updating position information in the map based on a result of a non-uniform rational b-spline interpolation algorithm.

Some aspects of the method also include decoding a fourth plurality of source indications of measurement devices(s) that generated the third plurality of locations, determining a fifth plurality of source bias information for each of the source indications; and updating position information in a map based on the fifth plurality of source bias information. Some aspects of the method include determining a plurality of locational bias information based on the third plurality of locations, and updating position information in a map based on the plurality of locational bias information Some aspects of the method also include transmitting the updated map position information to a different plurality of vehicles.

Another aspect disclosed is an apparatus for increasing the precision of an existing map. The apparatus includes an electronic hardware processor, an electronic hardware memory, operably coupled to the processor, and storing instructions that when executed by the electronic hardware processor, cause it to receive, from a network, a first plurality of messages from a second plurality of vehicles, decode each of the first plurality of messages to determine a third plurality of locations of the corresponding vehicles, and update position information in a map based on the third plurality of locations. In some aspects of the apparatus, the electronic hardware memory stores further instructions that cause the processor to set control points in an interpolation algorithm based on the third plurality of locations; and update position information in the map based on a result of the interpolation algorithm. In some of these aspects of the apparatus, the electronic hardware memory stores further instructions that cause the processor to update position information in the map based on a result of a b-spline interpolation algorithm. In some aspects of the apparatus, the electronic hardware memory stores further instructions that cause the processor to update position information in the map based on a result of a non-uniform rational b-spline interpolation algorithm.

In some aspects of the apparatus, the electronic hardware memory stores further instructions that cause the processor to decode a fourth plurality of source indications of measurement devices(s) that generated the third plurality of locations, determining a fifth plurality of source bias information for each of the source indications, and update position information in a map based on the fifth plurality of source bias information.

In some aspects of the apparatus, the electronic hardware memory stores further instructions that cause the processor to determine a plurality of locational bias information based on the third plurality of locations, and update position information in a map based on the plurality of locational bias information. In some aspects of the apparatus, the electronic hardware memory stores further instructions that cause the processor to transmit the updated map position information to a different plurality of vehicles.

Another aspect disclosed is an apparatus for increasing the precision of an existing map. The apparatus includes means for receiving, from a network, a first plurality of messages from a second plurality of vehicles, means for decoding each of the first plurality of messages to determine a third plurality of locations of the corresponding vehicles, and means for updating position information in a map based on the third plurality of locations.

Another aspect disclosed is a non-transitory computer readable storage medium comprising instructions that when executed cause a processor to perform a method of increasing the precision of an existing map. The method includes receiving, from a network, a first plurality of messages from a second plurality of vehicles, decoding each of the first plurality of messages to determine a third plurality of locations of the corresponding vehicles, and updating position information in a map based on the third plurality of locations. Some aspects of the method include setting control points in an interpolation algorithm based on the third plurality of locations; and updating position information in the map based on a result of the interpolation algorithm. In some of these aspects, the method includes updating position information in the map based on a result of a b-spline interpolation algorithm. In some of these aspects, the method includes updating position information in the map based on a result of a non-uniform rational b-spline interpolation algorithm.

Some aspects of the computer readable storage medium's method also include decoding a fourth plurality of source indications of measurement devices(s) that generated the third plurality of locations, determining a fifth plurality of source bias information for each of the source indications; and updating position information in a map based on the fifth plurality of source bias information. Some aspects of the method include determining a plurality of locational bias information based on the third plurality of locations, and updating position information in a map based on the plurality of locational bias information. Some aspects of the method also include transmitting the updated map position information to a different plurality of vehicles.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to participate in automated driving or parking systems. More particularly, it is contemplated that the described implementations may be included in or associated with a variety of automated vehicles or similar applications such as, but not limited to: automated distribution facilities, aviation automation, and similar veins. Thus, the teachings are not intended to be limited to the implementations depicted solely in the Figures, but instead have wide applicability as will be readily apparent to one having ordinary skill in the art.

Figure 1:
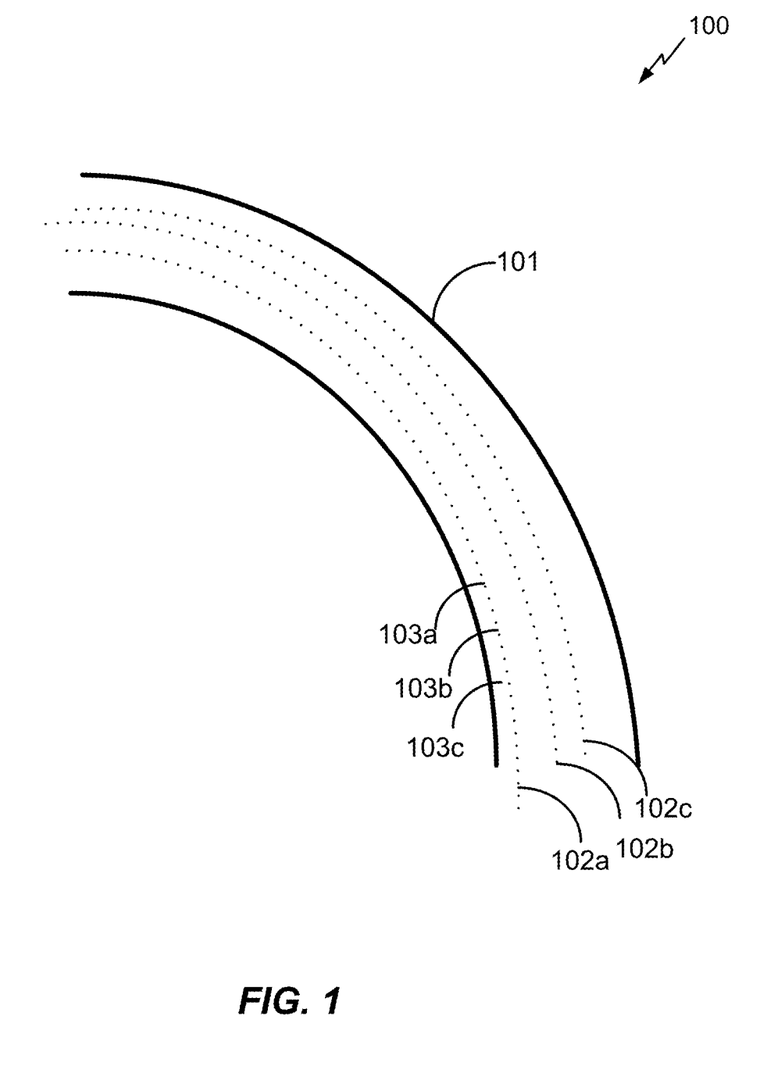
FIG. 1 shows a road and the paths of a plurality of vehicles on the road.

FIG. 1 shows a position of a road 101 as indicated in an existing map, such as a street map. Also shown are paths 102a-c of vehicles traveling on the road 101. Each of the paths 102a-c may be comprised of a plurality of data points, such as data points 103a-c which are part of path 102a. Each of the data points may be obtained, in some aspects, from a vehicle traveling along the road. For example, in some aspects, a vehicle may be equipped with an on-board location device, such as a global positioning system (GPS) receiver. In some aspects, a location of the vehicle may be obtained by the on-board location device and stored and/or transmitted over a wireless network to a mapping system. In some aspects, a location of the vehicle may be obtained at periodic time intervals, such as every 100, 200, 300, 400, or 500 milliseconds, and/or every 1, 2, 3, 4, 5, 6, 7, 8, 9, or 10 seconds. This series of location information provided by the vehicle may be used to electronically determine a path of the vehicle along the road, such as the paths 102a-c shown in FIG. 1. As shown in the figure, the vehicles generally follow the road 101.

Figure 2A:
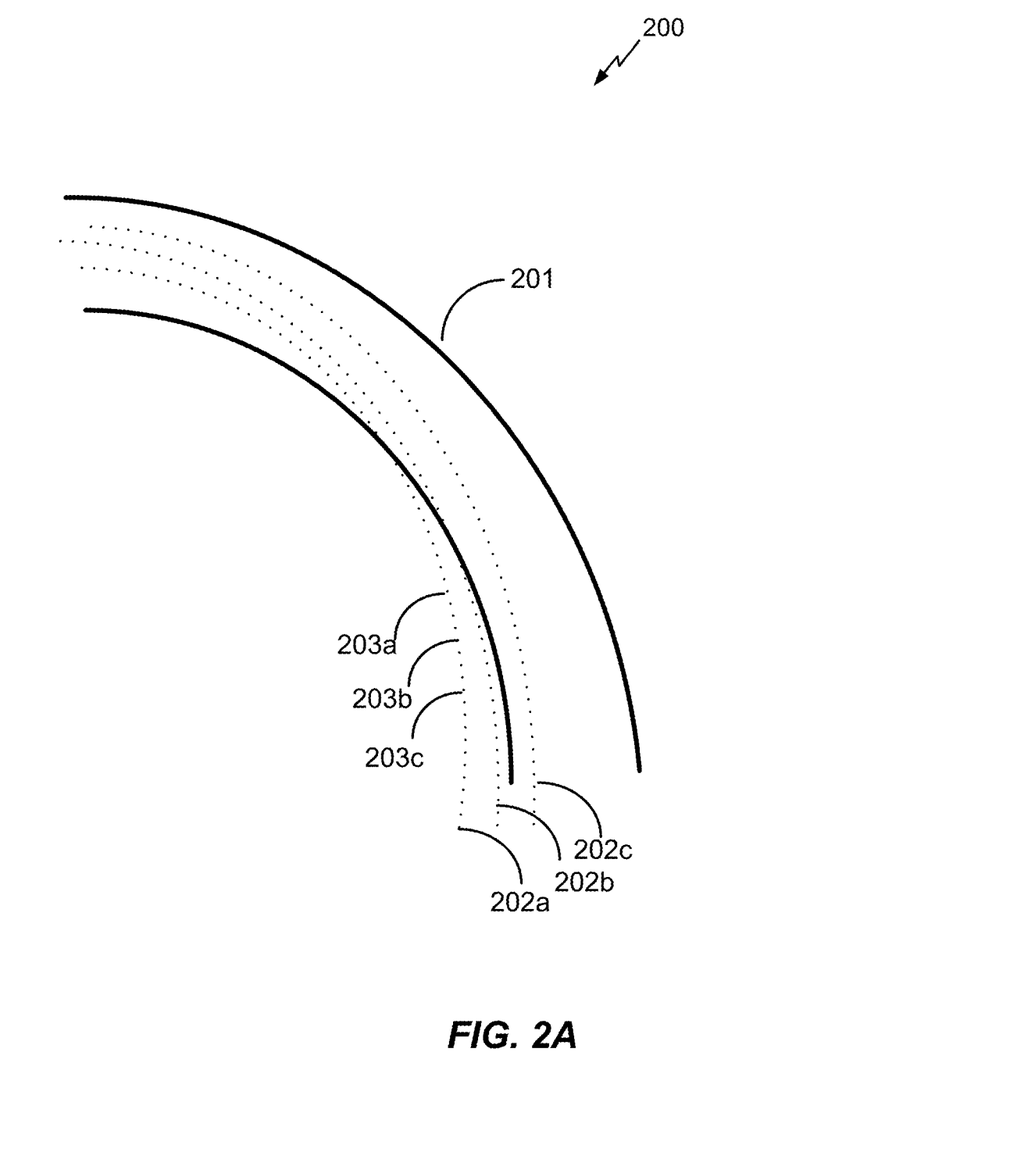
FIG. 2A shows a road and the paths of a plurality of vehicles on the road.
Figure 2B:
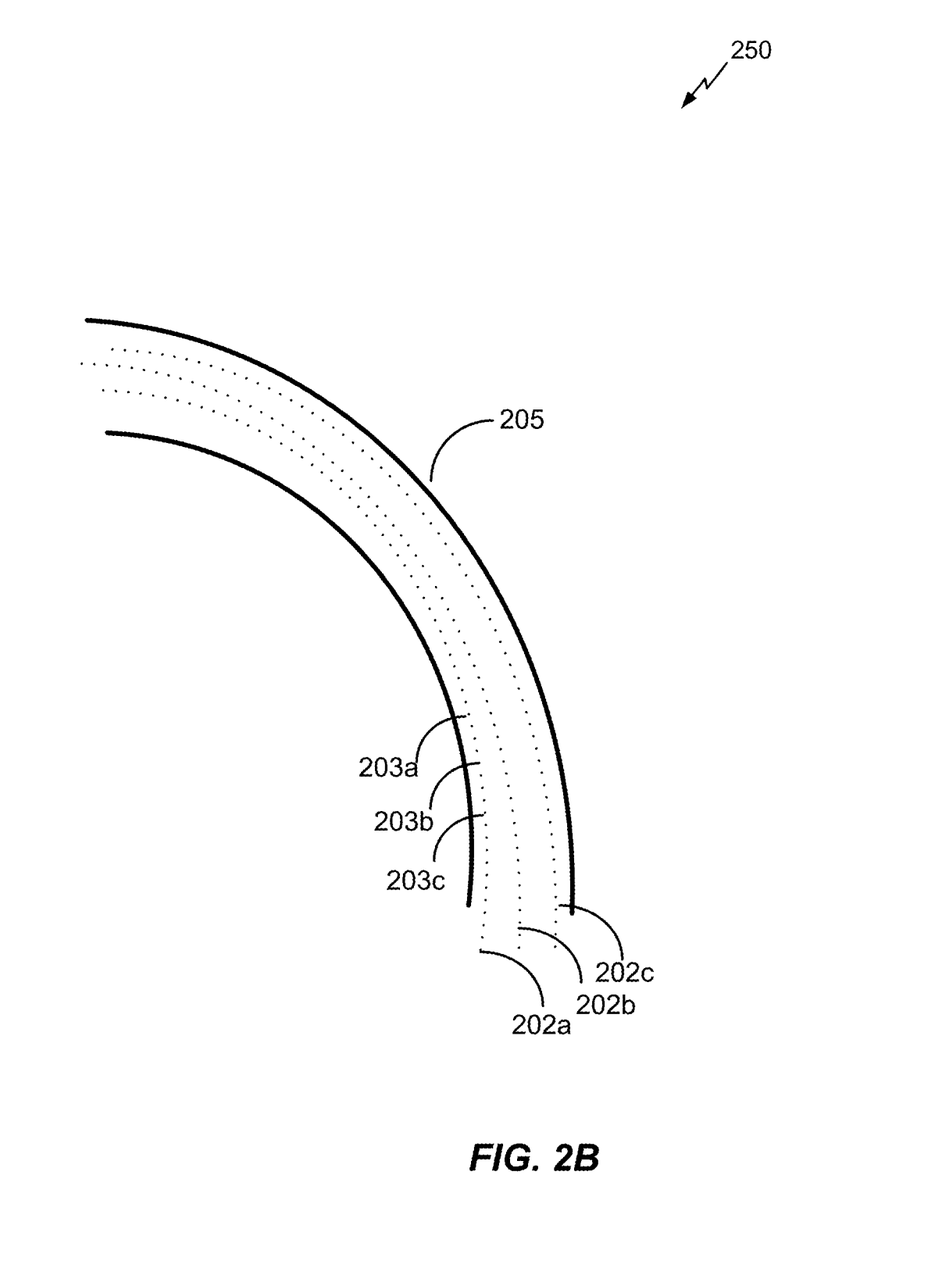
FIG. 2B shows a road and the paths of a plurality of vehicles on the road.

FIG. 2A show a position of a second road 201 as indicated in an existing map, such as a street map. Also shown are paths 202a-c of vehicles traveling on the road 201. Similar to the paths 102a-c of FIG. 1, the paths 202a-c are also comprised of a plurality of location data points 203a-c provided by vehicle(s) traveling on the road 201. In contrast to the paths 102a-c of FIG. 1, the paths 202a-c deviate from the position of the second road 201 in the existing map. Instead of following along the path of the road, the paths 202a-c may indicate that the position of the road 201 in the existing map is inaccurate. Thus, the position of the road 201 may be made more precise by utilizing data included in the paths 201a-c, such as the data points 203a-c. Methods and systems disclosed herein may adjust the position of the road 201 based on the paths 202*a-c* and/or the data points 203*a-c*. For example, as shown in FIG. 2B, the position of the road 201 has been adjusted and is reflected by road 205, which now more closely follows the paths 202*a-c*.

Figure 3:
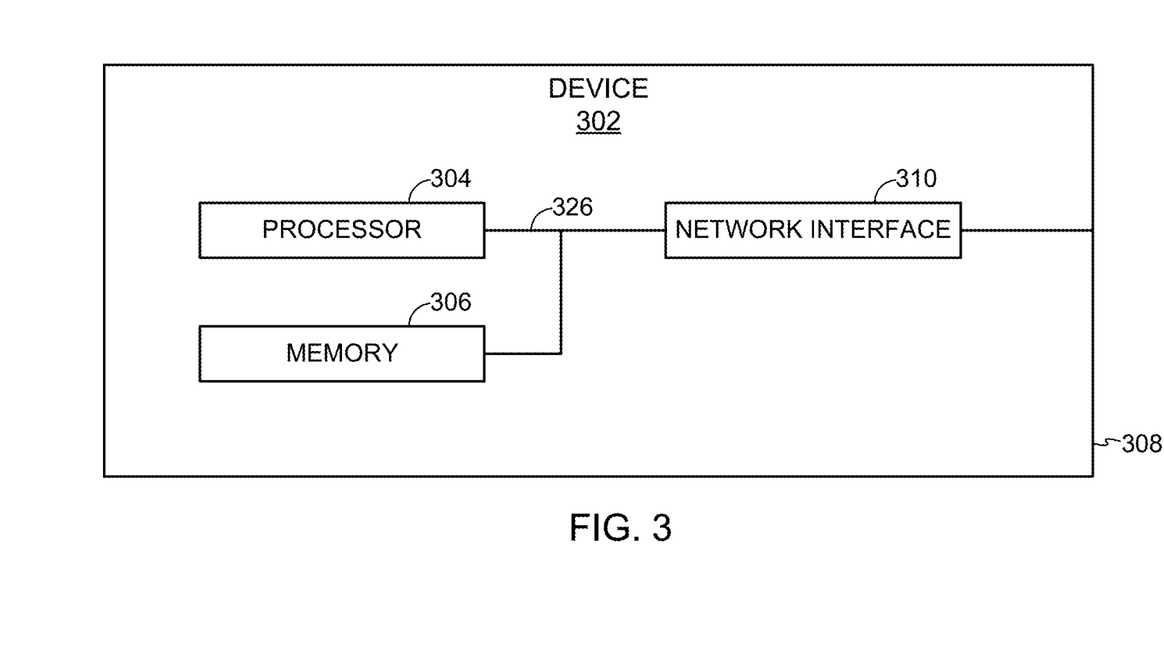
FIG. 3 illustrates an aspect of a device or system which may perform the methods and systems disclosed herein.

FIG. 3 illustrates an example of a device 302 or system which may adjust the position of a road in an existing map according to the embodiments disclosed herein. The device 302 may include a processor 304 which controls operation of the device 302. The processor 304 may also be referred to as a central processing unit (CPU). The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, graphics processor units (GPUs), or any other suitable entities that can perform calculations or other manipulations of information.

Memory 306, which may include both read-only memory (ROM) and random access memory (RAM), may provide instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein. The memory 306 may also comprise machine-readable media.

The memory 306 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors 304, may cause the device 302 to perform the various functions described herein. Accordingly, the processing system may include, e.g., hardware, firmware, and software, or any combination therein.

The device 302 may also include a housing 308, and a network interface 310 to allow transmission and reception of data between the device 302 and one or more other devices on a network.

The network interface 310 can be configured to transmit or receive messages over the network. The processor 304 may process messages and data to be transmitted via the network interface 210. The processor 304 may also process messages and data received via the network interface 210. The received information may include, for example, location information indicating a position of a vehicle.

The various components of the device 302 may be coupled together by a bus system 326. The bus system 326 may include a data bus, for example, as well as a power bus, a control signal bus, and a status signal bus in addition to the data bus. Those of skill in the art will appreciate that the components of the device 302 may be coupled together or accept or provide inputs to each other using some other mechanism.

Although a number of separate components are illustrated in FIG. 3, those of skill in the art will recognize that one or more of the components may be combined or commonly implemented. For example, the processor 304 may be used to implement not only the functionality described above with respect to the processor 304, but also to implement the functionality described above with respect to the memory 306 and/or network interface 310. Further, each of the components illustrated in FIG. 3 may be implemented using a plurality of separate elements.

Figure 4:
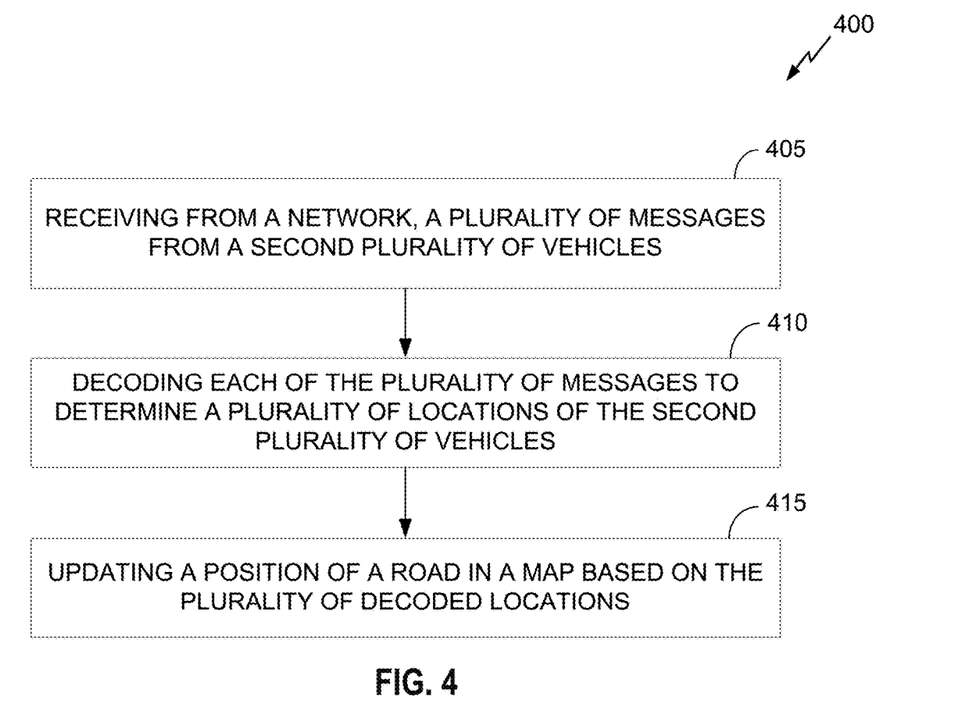
FIG. 4 is a flowchart of a method for improving the precision of a map.

FIG. 4 is a flowchart of a method of improving the precision of an existing map that may be implemented in some of the disclosed embodiments. The process 400 may be implemented, in some aspects, by the device 302 discussed above. For example, instructions in the memory 306 may configure the processor 304 in some aspects to perform the process 400.

In block 405, a plurality of messages is received from a second plurality of vehicles over a network. In some aspects, the second plurality of vehicles may each be equipped with positioning devices, such as a global positioning system (GPS) receiver, inertial navigation system (INS) or the like. In some aspects, the positioning devices of the vehicles may be lower cost, lower precision devices. For example, in some aspects, the precision of the location information they provide may have an uncertainty as large as 10 meters.

The plurality of vehicles may be configured to transmit indications of their positions over the network, such that they can be received by a system or apparatus performing process 400.

In block 410, each of the plurality of messages is decoded to determine a corresponding plurality of locations of the second plurality of vehicles. In some aspects, decoding each of the plurality of messages may include parsing or otherwise extracting information from the message based on a predetermined message format. For example, the location information may be located, in some aspects, at a fixed offset within the message, thus, decoding may include loading data from the fixed offset of the message and processing the loaded data as location information. In some other aspects, the plurality of messages may include xml data encoding the location information. Thus, decoding in these aspects may include parsing the xml data to obtain the location information.

In some aspects, a source of a positioning device determining the location information encoded in the message may also be decoded from the message. For example, in some aspects, an identifier of a manufacturer and/or model number of the positioning device may be decoded from the message. In some aspects, the message may include accuracy parameters associated with the encoded location information. For example, in some aspects, a vehicle may not only encode its position in a message, but may also encode parameters indicating how accurate the position information may be. For example, the message may indicate the position information is accurate within 1, 2, 3, 4, 5, 6, 7, 8, 9, or 10 meters or any accuracy in between.

In some aspects, bias information may be determined based on the decoded location information and source information. For example, in some aspects, a particular bias may be associated with a particular source, such as a manufacturer or model number of a positioning device. Thus, some aspects disclosed may adjust the decoded position information based on the bias information.

In some aspects, one or more atmospheric characteristics may be determined based on the decoded location information. For example, the accuracy of location information may depend on conditions of the ionosphere in a vicinity of a vehicle location. Thus, some aspects may determine current characteristics of the ionosphere in the vicinity of a particular vehicle location and utilize those characteristics when processing the decoded location information. For example, in some aspects, location information received during periods of high distortion of location data due to conditions of the ionosphere may be given a lower weight in determining an adjustment to a position of a road (discussed below with respect to block 415) than location information received during periods of relatively lower distortion of location data due to conditions of the ionosphere.

In block 415, a position of a road is updated in an existing map based on the plurality of decoded locations from block 410. For example, in some aspects, the locations of the vehicles decoded in block 410 may be used as control points to one or more interpolation algorithms. The interpolation algorithms may, in some aspects, perform a "best fit" analysis of the locations to determine a more precise position of a road being traversed by at least a portion of the plurality of vehicles. In some aspects, a b-spline algorithm may be used to determine a position of a road on a map. In some aspects, a non-uniform rational b-spline algorithm may be used to determine a position of a road. The position of the road may be adjusted based on results of the interpolation algorithm(s).

In some aspects, the interpolation algorithm may be further based on one or more of the location bias, source bias, or atmospheric bias discussed above.

The foregoing description details certain implementations of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

The technology is operational with numerous other general purpose or special purpose computing system environments or configurations. Examples of well-known computing systems, environments, and/or configurations that may be suitable for use with the development include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the implementations disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present development.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain implementations of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the implementations. It will also be appreciated by those of skill in the art that parts included in one implementation are interchangeable with other implementations; one or more parts from a depicted implementation can be included with other depicted implementations in any combination. For example, any of the various components described herein and/or depicted in the Figures may be combined, interchanged or excluded from other implementations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present development. At the very least, and not as an attempt to limit the application of the doctrine of equivalents to the scope of the claims, each numerical parameter should be construed in light of the number of significant digits and ordinary rounding approaches.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present disclosed process and system. Various modifications to these implementations will be readily apparent to those skilled in the art, and the generic principles defined herein may be applied to other implementations without departing from the spirit or scope of the disclosed process and system. Thus, the present disclosed process and system is not intended to be limited to the implementations shown herein but is to be accorded the widest scope consistent with the principles and novel features disclosed herein.

What is claimed is:

1. A method of increasing the precision of an existing map, comprising:
    receiving, from a network, a message from each of a plurality of vehicles;
    decoding each message to determine a location of the corresponding vehicle; and
    updating position information of a road in a map based on the locations of the vehicles.

2. The method of claim 1, further comprising:
    setting control points in an interpolation algorithm based on the locations of the vehicles; and
    updating the position information of the road in the map based on a result of the interpolation algorithm.

3. The method of claim 2, further comprising updating the position information of the road in the map based on a result of a b-spline interpolation algorithm.

4. The method of claim 3, further comprising updating the position information of the road in the map based on a result of a non-uniform rational b-spline interpolation algorithm.

5. The method of claim 1, further comprising:
    decoding a plurality of source indications of measurement devices that generated the locations of the vehicles;
    determining a plurality of source bias information for each of the source indications; and
    updating the position information of the road in a map based on the plurality of source bias information.

6. The method of claim 1, further comprising:
    determining a plurality of locational bias information based on the locations of the vehicles; and
    updating the position information of the road in a map based on the plurality of locational bias information.

7. The method of claim 1, further comprising transmitting the updated position information of the road to a plurality of vehicles.

8. An apparatus for increasing the precision of an existing map, comprising:
    an electronic hardware processor; and
    an electronic hardware memory, operably coupled to the processor, and storing instructions that when executed by the electronic hardware processor, cause it to:
        receive, from a network, a message from each of a plurality of vehicles,
        decode each message to determine a location of the corresponding vehicle, and
        update position information of a road in a map based on the locations of the vehicles.

9. The apparatus of claim 8, wherein the electronic hardware memory further stores instructions that when executed by the electronic hardware processor, cause it to:
    set control points in an interpolation algorithm based on the locations of the vehicles, and
    update the position information of the road in the map based on a result of the interpolation algorithm.

10. The apparatus of claim 9, wherein the electronic hardware memory further stores instructions that when executed by the electronic hardware processor, cause it to update the position information of the road in the map based on a result of a b-spline interpolation algorithm.

11. The apparatus of claim 10, wherein the electronic hardware memory further stores instructions that when executed by the electronic hardware processor, cause it to update the position information of the road in the map based on a result of a non-uniform rational b-spline interpolation algorithm.

12. The apparatus of claim 8, wherein the electronic hardware memory further stores instructions that when executed by the electronic hardware processor, cause it to:
    decode a plurality of source indications of measurement devices that generated the locations of the vehicle;
    determine a plurality of source bias information for each of the source indications; and update the position information of the road in the map based on the plurality of source bias information.

13. The apparatus of claim 8, wherein the electronic hardware memory further stores instructions that when executed by the electronic hardware processor, cause it to:
    determine a plurality of locational bias information based on the locations of the vehicles; and update the position information of the road in the map based on the plurality of locational bias information.

14. The apparatus of claim 8, wherein the electronic hardware memory further stores instructions that when executed by the electronic hardware processor, cause it to transmit the updated position information of the road to a plurality of vehicles.

15. An apparatus for increasing the precision of a map, comprising:
    means for receiving, from a network, a message from each of a plurality of vehicles;
    means for decoding each message to determine a location of the corresponding vehicle; and
    means for updating position information of a road in a map based on the locations of the vehicles.

16. A non-transitory computer readable storage medium comprising instructions that when executed cause a processor to perform a method of increasing the precision of an existing map, the method comprising:
    receiving, from a network, a message from each of a plurality of vehicles;
    decoding each message to determine a location of the corresponding vehicle; and
    updating position information of a road in a map based on the locations of the vehicles.

17. The non-transitory computer readable storage medium of claim 16, the method further comprising:
  setting control points in an interpolation algorithm based on the locations of the vehicles; and
  updating the position information of the road in the map based on a result of the interpolation algorithm.

18. The non-transitory computer readable storage medium of claim 17, the method further comprising updating the position information of the road in the map based on a result of a b-spline interpolation algorithm.

19. The non-transitory computer readable storage medium of claim 18, the method further comprising updating the position information of the road in the map based on a result of a non-uniform rational b-spline interpolation algorithm.

20. The non-transitory computer readable storage medium of claim 16, the method further comprising:
  decoding a plurality of source indications of measurement devices that generated the locations of the vehicle;
  determining a plurality of source bias information for each of the source indications; and
  updating the position information of the road in the map based on the plurality of source bias information.

21. The non-transitory computer readable storage medium of claim 16, the method further comprising:
  determining a plurality of locational bias information based on the locations of the vehicles; and
  updating the position information of the road in a map based on the plurality of locational bias information.

22. The non-transitory computer readable storage medium of claim 16, the method further comprising transmitting the updated position information of the road to a plurality of vehicles.

\* \* \* \* \*